US008624815B2

(12) United States Patent
So

(10) Patent No.: US 8,624,815 B2
(45) Date of Patent: Jan. 7, 2014

(54) LIQUID CRYSTAL DISPLAY DEVICE

(75) Inventor: Sung Jin So, Paju-si (KR)

(73) Assignee: LG. Display Co. Ltd., Seoul (KR)

( * ) Notice: Subject to any disclaimer, the term of this patent is extended or adjusted under 35 U.S.C. 154(b) by 1002 days.

(21) Appl. No.: 12/264,721

(22) Filed: Nov. 4, 2008

(65) Prior Publication Data

US 2009/0160838 A1 Jun. 25, 2009

(30) Foreign Application Priority Data

Dec. 20, 2007 (KR) ........................ 10-2007-0134143

(51) Int. Cl.
*G09G 3/36* (2006.01)
*G09G 5/00* (2006.01)
*G06F 3/038* (2013.01)

(52) U.S. Cl.
USPC ................ 345/98; 345/96; 345/100; 345/211

(58) Field of Classification Search
USPC ........................................................... 345/98
See application file for complete search history.

(56) References Cited

U.S. PATENT DOCUMENTS 7,907,110 B2 * 3/2011 Vergnes et al. ................ 345/98
2001/0024187 A1 * 9/2001 Sato et al. ....................... 345/98
2005/0231456 A1 * 10/2005 Nakamura et al. ............. 345/98

FOREIGN PATENT DOCUMENTS

KR 2002-12903 2/2002
KR 2003-91333 12/2003
KR 2007-30675 3/2007

OTHER PUBLICATIONS

Office Action dated Feb. 24, 2009 for Korean Patent Application No. 10-2007-0134143.

* cited by examiner

*Primary Examiner* — Charles V Hicks
(74) *Attorney, Agent, or Firm* — Brinks Gilson & Lione

(57) ABSTRACT

An LCD device being stably driven is disclosed. The LCD device includes: gate lines and data lines crossing each other; a gate driver applying gate scan signals to the gate lines; and a data driver applying pixel data voltages to the data lines. The data driver includes a multiplexer which includes first and second switches that allow a power supply terminal and a ground terminal to be alternatively connected.

2 Claims, 3 Drawing Sheets

LIQUID CRYSTAL DISPLAY DEVICE

RELATED APPLICATIONS

This application claims priority under 35 U.S.C. 119 to Korean Patent Application No. 10-2007-0134143, filed on Dec. 20, 2007, which is hereby incorporated by reference in its entirety.

BACKGROUND

1. Field of the Disclosure

This disclosure relates to a liquid crystal display device being stably driven.

2. Description of the Related Art

As the information society spreads, the requirements for display devices are varied and gradually increasing. In accordance therewith, a variety of display devices such as liquid crystal display (LCD) devices, plasma display panels (PDP), electro-luminescent display (ELD) devices, and so on, have been researched. Some display devices already have been widely produced.

More specifically, LCD devices are rapidly replacing cathode ray tubes (CRTs), because they have features such as superior picture quality, light weight, slimness, low power consumption, and so on. These LCD devices are being developed in a variety of shapes which are applied to notebook computer monitors, television display screens, and so on.

Such LCD devices include an LCD panel displaying pictures, and drivers driving the LCD panel. The drivers includes a gate driver generating gate scan signals which are applied to gate lines on the LCD panel, and a data driver generating pixel data voltages which are applied to data lines on the LCD panel.

The LCD panel includes first and second substrates and a liquid crystal layer interposed between the first and second substrates. The first substrate is defined by the data lines and the gate lines into pixel regions. Also, the first substrate includes thin film transistors formed at respective intersection regions of the gate lines and the data lines, and pixel electrodes connected to the respective thin film transistors. The second substrate includes red, green, and blue color filters formed in respective pixel regions, and a black matrix formed between the color filters. A common electrode can be formed on the color filters.

This LCD panel allows the thin film transistor to be turned on by the gate scan signal which is applied to the gate line, so that the pixel data voltage on the data line is applied to the pixel electrode through the turned-on thin film transistor. At this time, a common voltage is applied to the common electrode. In accordance therewith, an electric field is generated by a voltage difference between the pixel data voltage on the pixel electrode and the common voltage on the common electrode, and controls an alignment direction of liquid crystal molecule included in the liquid crystal layer, thereby adjusting a light transmittance of the liquid crystal layer. As a result, a picture (or an image) can be displayed on the LCD panel.

However, the LCD device in the related art has a disadvantage in that the data driver generating the pixel data voltages is frequently damaged by means of static electricity from the exterior.

More specifically, the data driver includes a multiplexer alternatively applying positive and negative polarity pixel data voltages to the data lines every one horizontal period. The multiplexer includes a plurality of switches which are connected to the respective data lines in configuration. The plural switches are generally formed in a connection configuration which is adjacent to a power supply terminal (or a power supply source) and a ground terminal (or a ground source). Due to this, when the static electricity is input from the exterior to the switches, the adjacent power supply and the ground terminals can be connected to each other and/or to the internal wirings of the data driver. Accordingly, the input electricity should be applied to other circuits inside the data driver. As a result, elements and wirings on the inside of the data driver can be damaged.

SUMMARY

According to one general aspect of the present embodiment, an LCD device includes: gate lines and data lines crossing each other; a gate driver applying gate scan signals to the gate lines; and a data driver applying pixel data voltages to the data lines, and including a multiplexer which includes first and second switches that allow a power supply terminal and a ground terminal to be alternatively connected, wherein the first and second switches include source electrodes, drain electrodes, and gate electrodes, respectively, and the source electrodes are alternatively connected to the power supply terminal and the ground terminal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
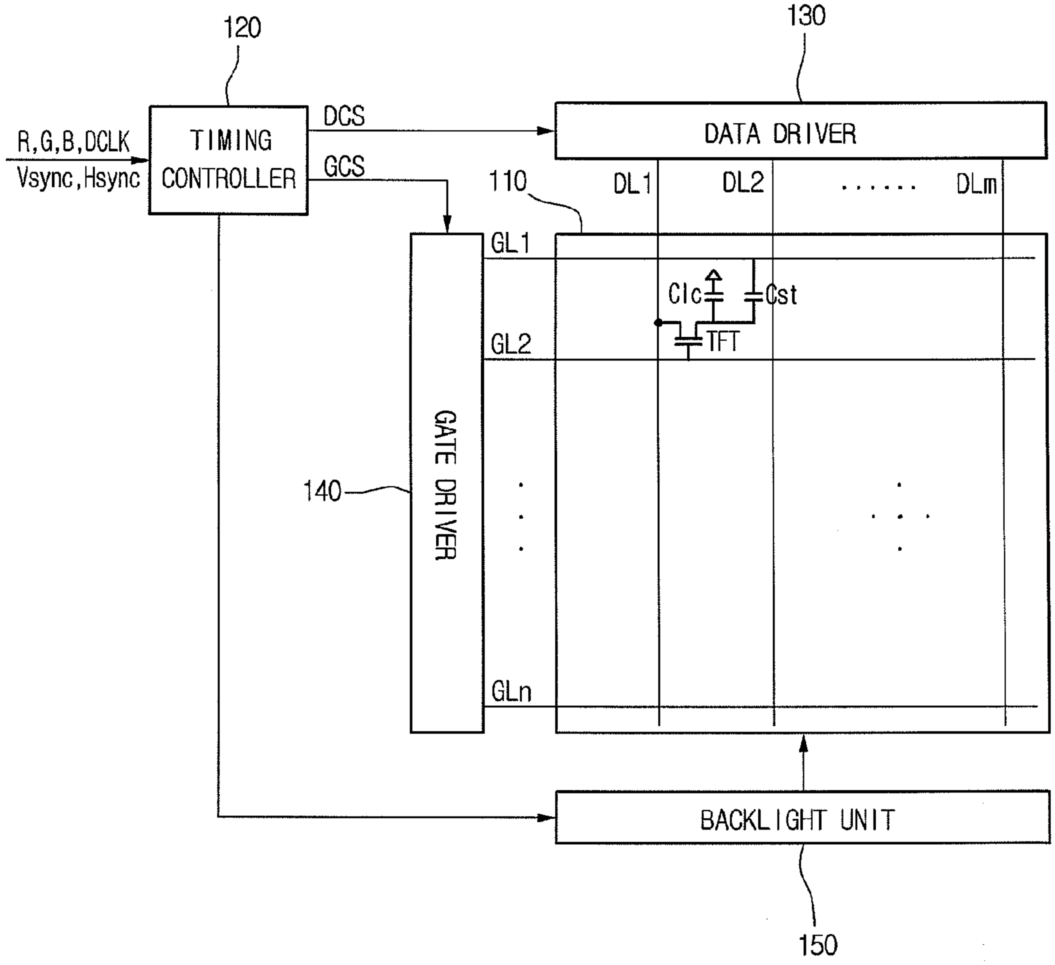
FIG. 1 is a block diagram showing the configuration of an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
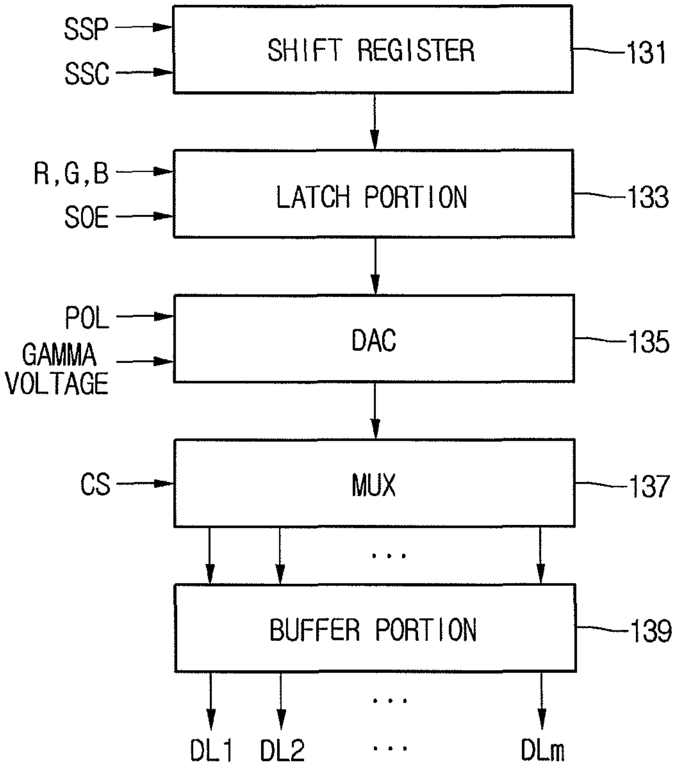
FIG. 2 is a detailed block diagram showing the configuration of a data driver in FIG. 1.

FIG. 1 is a block diagram showing the configuration of an LCD device according to an embodiment of the present disclosure, and FIG. 2 is a detailed block diagram showing the configuration of a data driver in FIG. 1. Referring to FIGS. 1 and 2, an LCD device includes: an LCD panel 110 displaying pictures (or images); a gate driver 140 driving a plurality of gate lines GL1~GLn on the LCD panel 110; a dada driver 130 driving a plurality of data lines DL1~DLm on the LCD panel 110; a timing controller 120 generating control signals to be applied to the gate and data drivers 140 and 130; and a backlight unit 150, responsive to the control signals from the timing controller 120, applying lights to the LCD panel 110.

The LCD panel 110 includes pixels which are respectively formed in regions defined by the plural gate lines GL1~GLn and the data lines DL1~DLm. Each pixel includes a thin film transistor TFT formed in a intersection of the respective data line DL1~DLm and the respective gate line GL1~GLn, and a liquid crystal cell Clc connected between the thin film transistor TFT and a common electrode. The thin film transistor TFT responds to a gate scan signal on the respective gate line GL1~GLn and switches a pixel data voltage which will be applied from the respective data line DL1~DLm to the respective liquid crystal cell Clc. The liquid crystal cell Clc includes a pixel electrode and a common electrode opposite each other in the center of a liquid crystal layer. The pixel electrode is connected to the thin film transistor TFT. The voltage charged in the liquid crystal cell Clc is upgraded every time the thin film transistor TFT is turned on. Moreover, each pixel further includes a storage capacitor Cst connected between the thin film transistor TFT and the previous gate line. The storage capacitor Cst minimizes a natural decrease (i.e., leakage) of the voltage charged in the liquid crystal cell Clc.

The timing controller 120 derives gate control signals GCS and data control signals from a data clock DCLK, horizontal and vertical synchronous signals Hsync and Vsync, and so on which are applied from an external system such as a graphic module of computer or an image demodulation module of television receiving system. The gate control signals GCS are applied to the gate driver 140, and the data control signals DCS are applied to the data driver 130.

The gate driver 140 responds to the gate control signals GCS from the timing controller 120 and applies gate scan signals to the respective gate lines GL1~GLn. The gate scan signals sequentially enable the plural gate lines GL1~GLn by one horizontal synchronous signal period.

The data driver 130 responds to the data control signals DCS from the timing controller 120 and generates pixel data voltages which are applied to the respective data lines DL1~DLm on the LCD panel 110, every time any one of the gate lines GL1~GLn is enabled. In detail, the data driver 130 receives pixel data by one line from the timing controller 120, and converts the received pixel data by one line into the pixel data voltages, which each have the shape of an analog signal, using a gamma voltage set (not shown).

To this end, the data driver 130 includes: a shift register 131 providing sequential sample signals; a latch portion 133, responsive to the sampling signals, latching and outputting a video data R, G, and B; a digital-to-analog converter (DAC) 135 converting the video data R, G, and B from the latch portion 133 into analog pixel data voltages; a multiplexer (MUX) 137 selectively outputting the pixel data voltages; and a buffer portion buffering the pixel data voltages from the multiplexer 137 and outputting the buffered pixel data voltages to the data lines DL1~DLm.

The shift register 131 sequentially shifts a source start pulse SSP in synchronization with a source sampling clock SSC and outputs a plurality of the sampling signals.

The latch portion includes a plurality of latches which respond to the respective sampling signals from the shift register 131 and sequentially sample and latch pixel data by constant numbers. The plural latches simultaneously output the latched pixel data by responding to a source output enable signal SOE.

The digital-to-analog converter 135 uses positive and negative gamma voltages from a gamma voltage portion (not shown), converts the pixel data from the latch portion 133 into the analog pixel voltages, and outputs the converted pixel voltages. Also, the digital-to-analog converter 135 replies to a polarity control signal POL and forces the pixel voltages to each have a polarity (i.e., a positive polarity or a negative polarity) in accordance with a previously set drive mode (for example, one of dot inversion, line inversion, and so on).

The multiplexer 137 responds to a control signal CS from the exterior and alternatively outputs pixel voltages from the digital-to-analog converter 135 every horizontal synchronous period.

The buffer portion 139 buffers the pixel voltages from the multiplexer 137 and outputs the buffered pixel voltages to the data lines DL1~DLm.

Herein, the multiplexer 137 includes a plurality of switch elements (not shown) that each have an output terminal connected to the buffer portion 139. These switch elements in the present embodiment will be explained in detail with reference to FIG. 3.

Figure 3:
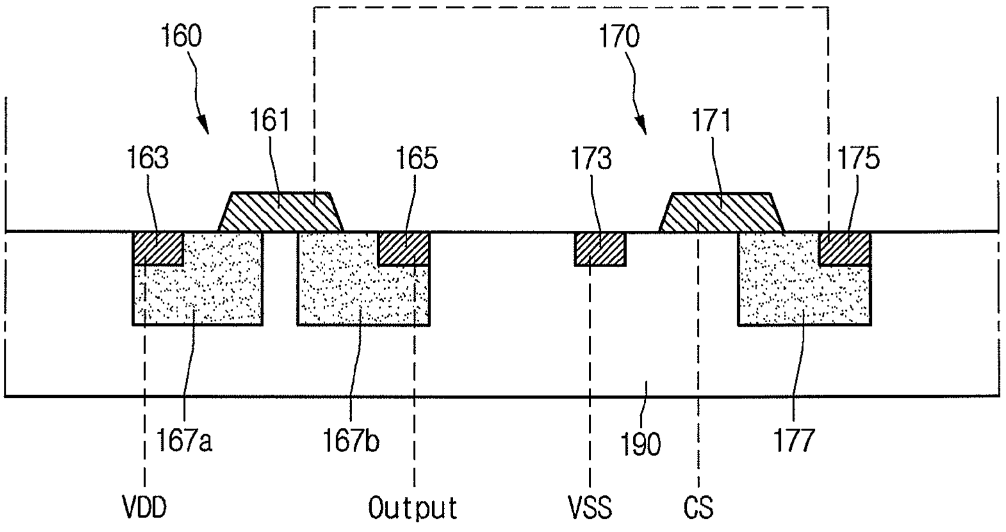
FIG. 3 is a cross sectional view showing the structure of switches included in a multiplexer in FIG. 2.

FIG. 3 is a cross sectional view showing the switch elements included in the multiplexer 137 shown in FIG. 2. As shown in FIG. 3, first and second switch elements 160 and 170, which are included in the data driver 130 of the LCD device according to the embodiment of the present disclosure, are connected to an input terminal of the buffer portion 139 shown in FIG. 2.

The first and second switch elements 160 and 170 include p-type transistors. However it will be recognized that, the first and second switch elements can consist of n-type transistors and thus the invention is not limited to the above disclosed embodiment.

These switch elements 160 and 170 are formed on a semiconductor substrate 190 and are separated from each other. The first switch element 160 includes a first gate electrode 161, a first source electrode 163, and a first drain electrode 165. First dopant regions 167*a* and 167*b* are formed between the first gate electrode 161 and the first source and drain electrodes 163 and 165.

Similarly, the second switch element 170 includes a second gate electrode 171, a second source electrode 173, and a second drain electrode 175. A second dopant region 177 is formed between the second gate electrode 171 and the second drain electrode 175.

The first source electrode 163 of the first switch element 160 is connected to a power supply terminal (or source) VDD, and the first drain electrode 165 is connected to an output terminal Output which is connected to the buffer portion 139. The first gate electrode 161 is connected to the second drain electrode 175 of the second switch element 170. On the other hand, the second source electrode 173 of the second switch element 170 is connected to a ground terminal VSS, and the second gate electrode 171 of the second switch element 170 receives a drive signal CS from the exterior.

Consequently, the first and second switch elements 160 and 170 are configured such that one is selectively turned on by the control signal CS and then the other one is turned off.

Also, it is evident that the first and second switch elements 160 and 170 are connected to one buffer that is connected to one of data lines DL1~DLm. Furthermore, the first and second source electrodes 161 and 171 of the first and second switch elements 160 and 170 are selectively connected to the respective power supply and ground terminals VDD and VSS.

In this manner, since the first and second source electrodes 161 and 171 are alternatively connected to the respective power supply and ground terminals VDD and VSS, the adjacent power supply and ground terminals VDD and VSS can be not connected to each other and simultaneously to the internal wirings of the data driver (i.e., the input terminal of the buffer portion 139), due to the static electricity, when the static electricity is input to the first and/or second switch elements 160 and/or 170. Consequently, the distance between the adjacent power supply and ground terminals VDD and VSS is enlarged. Accordingly, the internal elements and wirings of the data driver 130 shown in FIG. 1 can be damaged by static electricity. As a result, the data driver 130 shown in FIG. 1 may be protected from the defects and may improve its reliability.

As described above, the LCD device according to an embodiment of the present disclosure is alternatively connected to the power supply terminal (or source) and the ground terminal (or source) by means of the switch elements of the multiplexer, so that the distance between the power supply terminal (or source) and the ground terminal (or source) is enlarged in comparison with the one of the related art. The LCD device of the present embodiment can corrects the problem in that the internal elements and wirings included in the data driver are damaged due to static electricity from the exterior. As a result, the LCD device of the present embodiment prevents the defects of the data driver and improves its reliability.

It will be apparent to those skilled in the art that various modifications and variations can be made in the present disclosure. Thus, it is intended that the present disclosure cover the modifications and variations of this embodiment provided they come within the scope of the appended claims and their equivalents.

The invention claimed is:

1. A liquid crystal display device comprising:

gate lines and data lines crossing each other;

a gate driver applying gate scan signals to the gate lines; and a data driver applying pixel data voltages to the data lines, and including a multiplexer which includes first and second switches that allow a power supply terminal and a ground terminal to be alternatively connected, wherein the first switch includes a first gate electrode, a first source electrode and a first drain electrode, and the second switch includes a second gate electrode, a second source electrode and a second drain electrode, wherein the first source electrode is connected to the power supply terminal, and the first drain electrode is connected to an output terminal output which is connected to a buffer portion of the data driver, and the first gate electrode is connected to the second drain electrode and, the second source electrode is connected to the ground terminal, and the second gate electrode receives a control signal from the exterior, wherein the first and second switches configure a formation in which one is selectively turned on by the control signal and then the other one is turned off, wherein the first drain electrode is adjacent arranged the second source electrode, wherein the first drain electrode is separated from the second source electrode at a fixed interval.

2. The liquid crystal display device claimed as claim 1, wherein the first and second switches include any one of N-type and P-type transistors.

* * * * *